United States Patent Office 3,487,772
Patented Jan. 6, 1970

3,487,772
PRESS HYDRAULIC OVERLOAD SYSTEM
Derald H. Kraft, Canton, Ohio, assignor to E. W. Bliss Company, Canton, Ohio, a corporation of Delaware
Filed Mar. 7, 1968, Ser. No. 711,433
Int. Cl. B67b 3/26; F16p 3/00; F16n 1/00
U.S. Cl. 100—53
12 Claims

ABSTRACT OF THE DISCLOSURE

A novel hydraulic overload system which can be inexpensively added to existing presses utilizing the press lubrication oil system.

---

This invention relates to a safety assembly for power presses, and more particularly to an improved system for preventing overload of a power press and injury to the press which would result from such overload.

Hydraulic overload systems built into a press are well-known, but the present invention has as an object providing an hydraulic overload safety system which can be added to an existing press, not having such a system, without undue expense or modification of the press, and utilizing existing oil lubrication systems for the press.

A basic component of a power press is the slide or ram which moves up and down and is the force imparting means. Flanges are usually attached or bolted to the slide and can be interchangeably used to change the configuration of the slide.

It is a concept of the present invention to provide a novel press flange arrangement housing the load responsive components of an overload system, which can easily be bolted to existing press slides replacing existing flanges. The flanges are machined with respect to the slide to provide an overload chamber between the flange and slide. The chamber is filled with lubrication oil from the press lubrication system, and a relief valve is mounted on the flange in communication with the overload chamber. An oil sump is built within the slide flange, also in communication with the relief valve, so that when overload occurs, oil from the overload chamber is dumped to the oil sump.

To establish the necessary hydraulic preload pressure in the overload cavity, the latter is connected to existing press lubrication systems. Such systems are usually provided with a metering block designed to dispense oil to press lubrication points. In accordance with the present invention, a fourth section is added to the metering block, and is connected to the overload chamber to dispense oil into the overload chamber as well as to the press lubrication points.

Between the metering block, and the conventional lubrication system pump and filter, a diverting valve is disposed, operable to connect the lubrication system pump alternatively with the metering block or directly with the overload chamber.

In operation, the overload chamber is initially quickly filled and pressurized by actuating the diverting valve to direct the lubrication fluid directly to the overload chamber, after which the diverting valve is actuated to direct the lubrication fluid through the system metering block. The connection between the metering block and the overload chamber provides the makeup flow necessary to compensate for leakage from the chamber, and at the same time to maintain the preload pressure initially established in the overload chamber.

The invention and advantages thereof will become more apparent upon consideration of the following specification, with reference to the accompanying drawings, in which.

Figure 1:
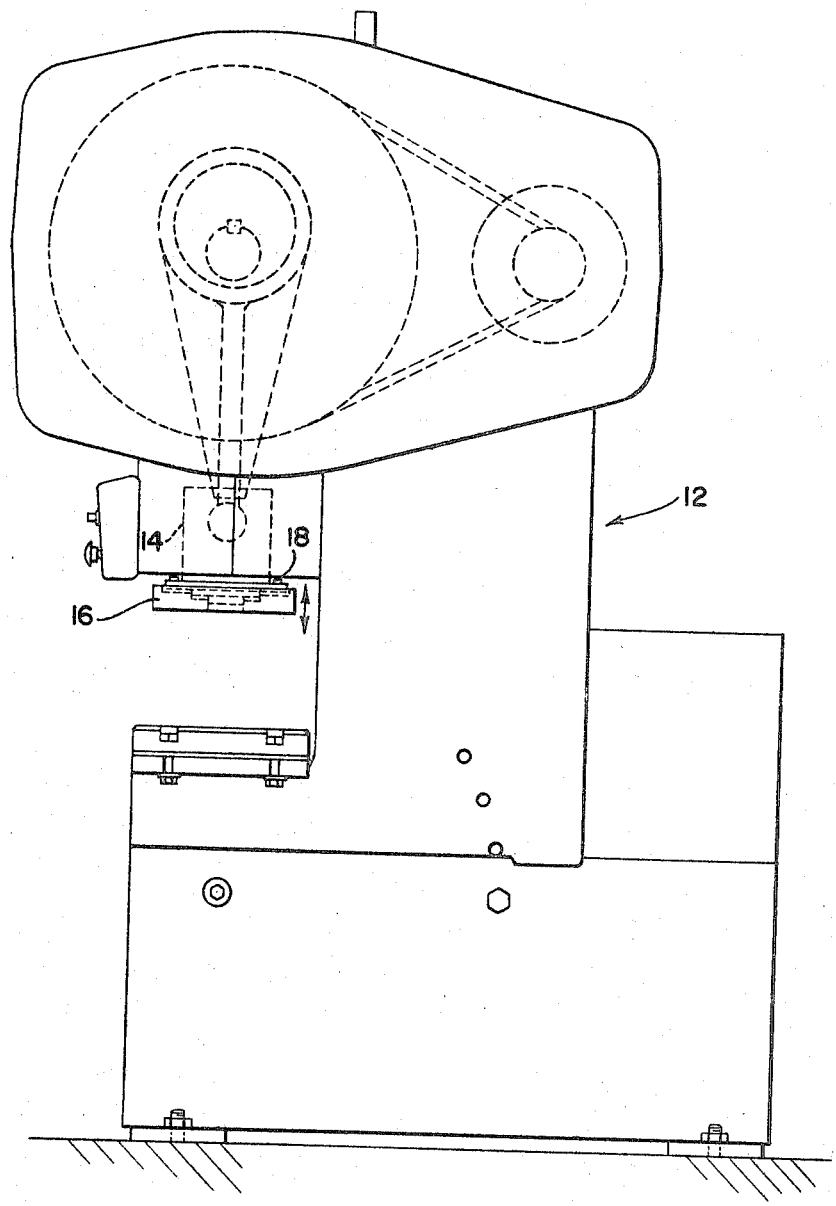
FIGURE 1 is a vertical side view of a press illustrating location of the load responsive components of an overload system in accordance with the invention.

Referring to FIGURE 1, a press generally designated with the numeral 12 is provided with a slide 14 to the bottom or impact side of which slide flange 16 is bolted. Normally, four corner bolts 18 hold the flange to the slide, the flange being a flat or rectangular member at the bottom of the slide to which the press forming components are attached.

Figure 2:
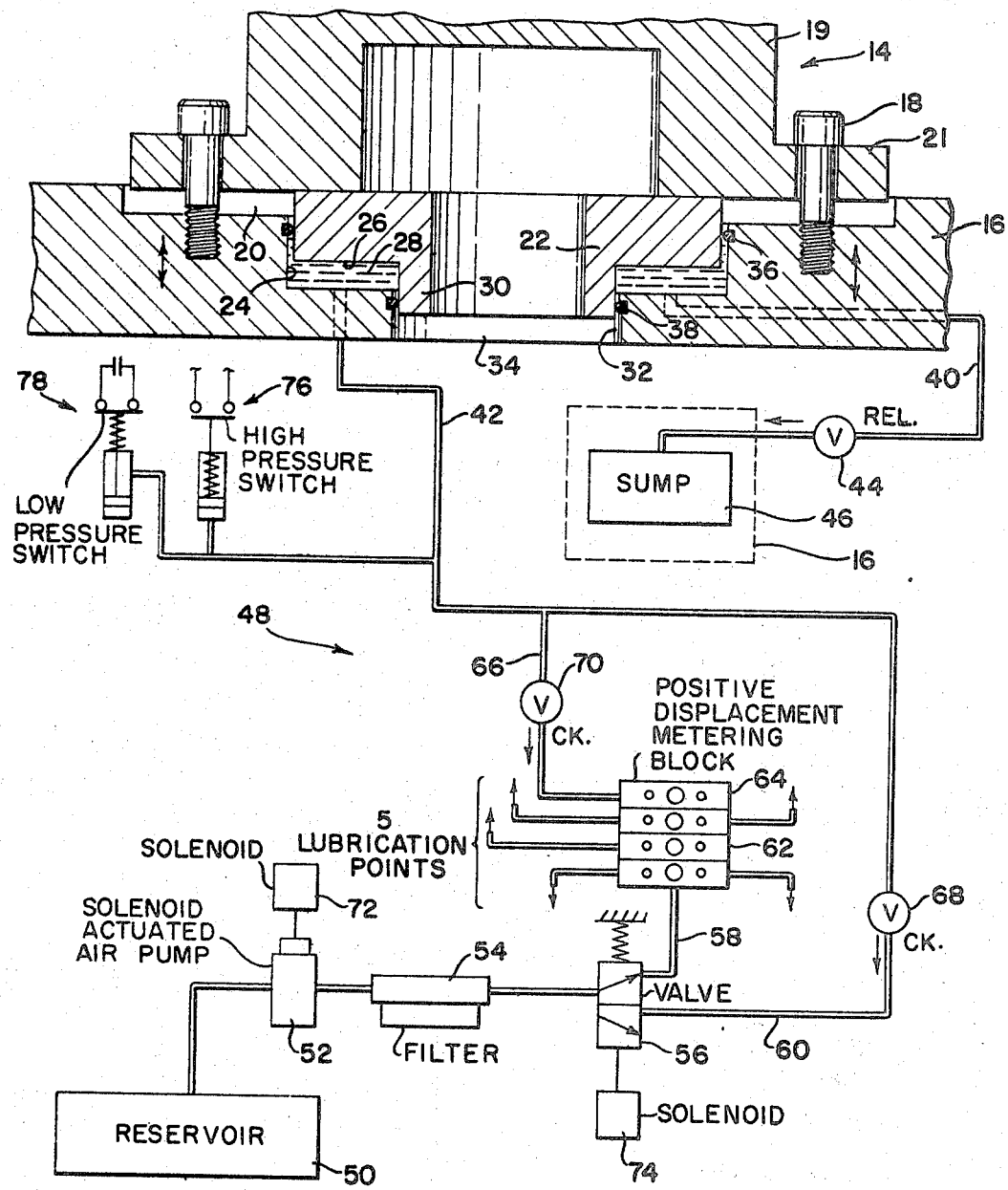
FIGURE 2 is a partial section and schematic view showing details of the overload system and connection of the overload system with a press lubrication system, in accordance with the invention.

In more detail, the press slide 14 is provided in the usual manner with a cylindrical barrel 19, FIGURE 2, and at the bottom of the barrel, outwardly extending feet 21 (on all four corners) which extend laterally providing a seat to which flange 16 is bolted by stripper bolts 18. Conventionally, the flange 16 is rigidly bolted to the slide 14, but in the present instance, in accordance with the invention, the flange is provided in its upper surface with an annular recess 20 of sufficient diameter to permit the slide to move up and down (in the present view) within the recess. The bolts 18 merely limit the travel of the slide away from the flange, or vice versa, and hold the flange when biased away from the slide, to the slide. In addition the bolts prevent lateral movement of the flange relative the slide.

Seated against the bottom side of the slide 14 is a piston 22, of lesser diameter than the recess 20 and having a thickness greater than the depth of the recess. To accommodate the greater thickness, the recess is counterbored to a diameter slightly greater than that of the piston forming a downwardly extending bore 24 in the flange, coaxial with the recess 20, in which the piston 22 rides. The bottom surface 26 of the piston defines with the flange 16 bore overload chamber 28. A cylindrical ring portion 30 extends downwardly from the body of the piston 22 cooperating with encompassing surface 32 of the flange to guide and seal the overload chamber. The surface 32 is formed by further counterboring the flange with an opening 34 of lesser diameter than bore 24, which extends through the flange and has a diameter slightly greater than that of the portion 30 of the piston. Completing the seal are O rings 36 and 38 above and below overload chamber 28 between cooperating surfaces of the piston 22 and the flange 16.

During operation, the overload chamber 28 is filled with oil, under pressure, forcing the piston 22 upwardly against the bottom face of slide 14. Pressure within the overload chamber also forces the flange 16 downwardly until restrained by bolts 18, biasing the flange away from the slide, and in operation, the pressure is sufficient so that the flange is rigidly held relative the slide, against the bolts.

The overload chamber 28 is provided with two connections 40 and 42, connection 40 leading to a pressure relief valve 44 mounted on the outside of the flange 16. The valve 44 in turn is connected with reservoir or sump 46 which preferably is a cavity bored within the flange. The other connection is line 42 connected with the press lubrication system, generally designated with the number 48.

As an alternative to the pressure relief valve 44, a blow-out valve could be used of the type comprising a screw cap with a diaphragm placed therein. The diaphragm would be calculated to rupture at a predetermined p.s.i.

The press lubrication system 48, and connections with the overload chamber, are illustrated in FIGURE 2. Preferably, the lubrication system is of the modular design, comprising a conventional reservoir 50 connected in the example to a solenoid actuated air pump 52 and filter 54.

One suitable pump is a single-acting air-lube pump made by Trabon Engineering Corporation of Cleveland, Ohio, powered by air pressure, and usually a 3-way small air solenoid valve, controlled by a timer or limit switch, provides the air actuation. Whereas in the conventional system, the air pump and filter are connected to a positive-displacement metering block, which in turn dispenses lubricating oil to the points of lubrication, such as bearings, connections and gibs, in the present invention, the pump and filter are first connected to a diverting valve 56, which in turn has connections 58 and 60, one leading to the positive displacement metering block 62, the other directly to the overload chamber 28 via connection 42. The metering block, in addition to having the usual sections for the lubrication points, has an additional section 64 to dispense oil to connections 66 and 42 and overload chamber 28.

In each of the connections 60 and 66, ball check valves 68 and 70 are provided to prevent back flow in these connections.

Still referring to FIGURE 2, the air pump and diverting valve each are provided with solenoids, items 72 and 74, functions of which are to actuate the air pump and diverting valve respectively. The sequence of actuation of these items will be described with reference to subsequent description of an electrical system for the press.

Also illustrated on FIGURE 2 are high pressure and low pressure switches 76 and 78 responsive to pressure within the overload chamber 28. The use of these two items also will become apparent upon consideration of the following description of an electrical circuit for the press.

Figure 3:
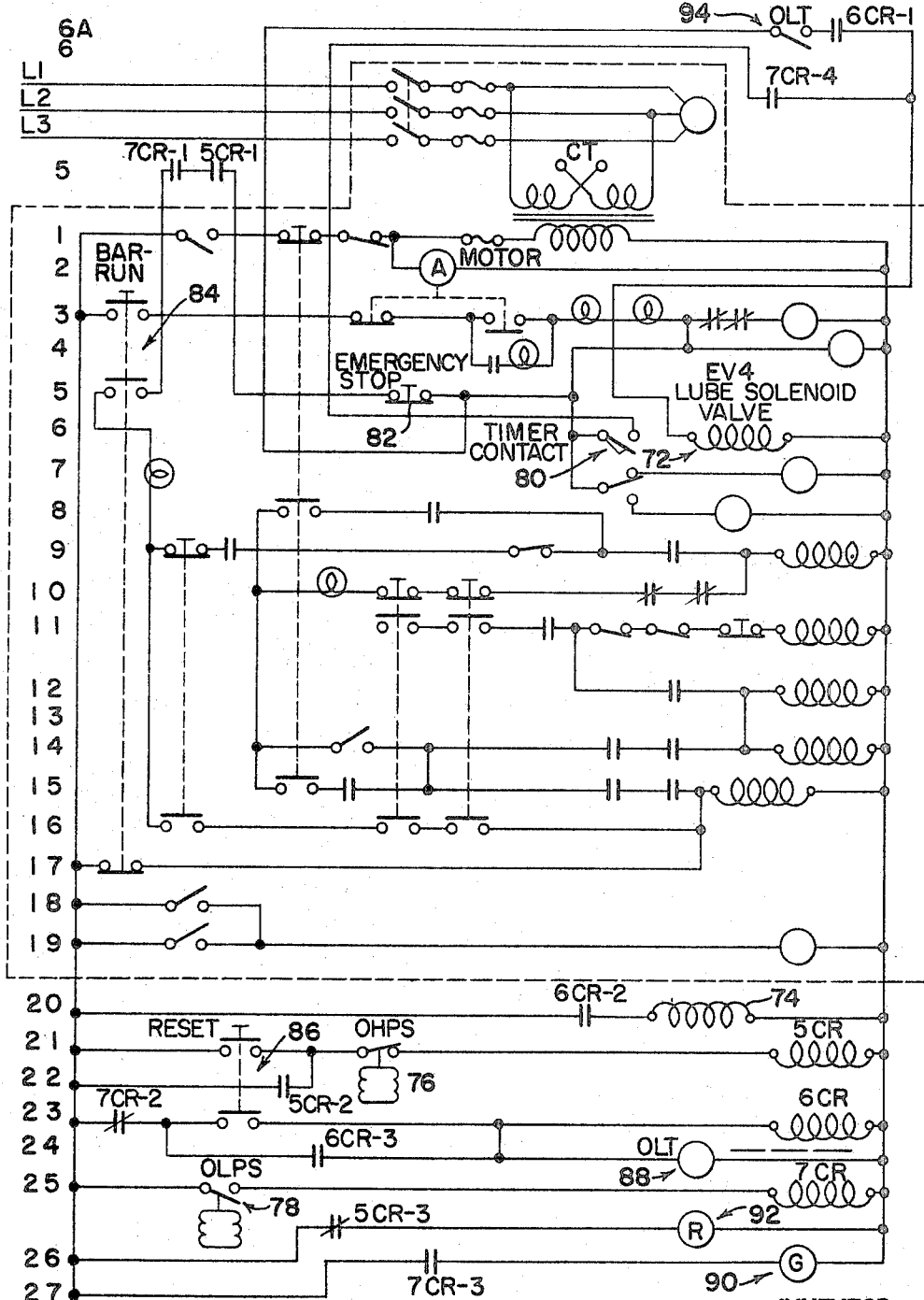
FIGURE 3 is an electrical diagram showing operation of the overload system in accordance with concepts of the invention.

Turning now to FIGURE 3, the electrical circuit is illustrated, the portion of the circuit encompassed by dashed lines being drawn for a lubrication system of a press, the portion outside of the dashed lines being additional circuit components added for the purpose of control of the overload system along with the press lube system in accordance with the invention.

It is redundant to describe the circuit for the lube system, the circuit being known, except to state that a 2-phase current is supplied to the circuit by lines $L_1$ and $L_2$ through transformer "CT" in turn supplying current to solenoid coil EV-4 (in line 6) of solenoid 72, FIGURE 2. The solenoid is energized by closing certain switches and relays, including timer contact 80, the solenoid opening and closing an air valve which actuates air pump 52, FIGURE 2. Also to be mentioned are emergency stop button 82 and bar-run switch 84 both in line 5 which in part permit and terminate the flow of current to solenoid coil EV-4 for emergency stop and starting of the press.

Assuming that all steps have been taken for placing the press in operation, including starting of the lube pump, the press is still not ready for operation until energizing the overload circuit. In essence, the overload circuit comprises, lines 20 through 27 of the circuit at the bottom of FIGURE 3 and the portions of lines 5, 6 and 6A outside the encircled dashed area at the top of the figure.

Main components of the overload circuit comprise or include solenoid coil 74a in line 20 of the circuit for the diverting valve 74, the solenoid coil EV-4 line 6 for the air pump valve, mentioned above, reset button 86 lines 21 and 23 of the circuit, overload high pressure switch "OHPS" (76) in line 21, overload low pressure switch 78 in line 25 and overload lube timer "OLT" (88) in line 24. Lines 21 and 23 contain coils 5CR and 6CR, the solenoid 5CR actuating relays 6CR–1 (line 6A), 6CR–2 (line 20) and 6CR–3 (line 24). Also included in the overload circuit is green "preload" light "G" (90) in line 27 and red "overload" light "R" (92) in line 26. The other components of the circuit include coil 7CR (line 25) actuating relays 7CR–1 (line 5), 7CR–2 (line 23), 7CR–3 (line 27) and 7CR–4 (line 6), as well as overload timer switch "OLT" (94) in line 6A. The functioning of the circuit and these components will become apparent from the following description.

The press is ready for operation only after pressing the "reset" button 86 (lines 21 and 23 of FIGURE 3) which energizes both electrical lines 21 and 23, and coils 5CR and 6CR. The overload high pressure switch 76 is normally in its closed position as shown, in the absence of an overload condition (an overload condition opens the switch).

The coil 5CR actuates press stop relay 5CR–1 (in-line 5 and normally open) to a closed position. This relay is in the press motor circuit and in the open position is operative to prevent the flow of current to the motor. The coil 5CR also actuates hold relay 5CR–2 (in line 22 and also normally open) to a closed position, and overload indicator light relay 5CR–3 (line 26 and normally closed) to an open position, shutting off the red indicator light 92. Relay 5CR–2 energizes the circuit which holds the reset button 86 in its closed or pressed down hold position.

Energizing coil 6CR in line 23 actuates relay 6CR–1 in line 6A closing the relay. This relay also is normally open (as with 5CR–1) and affects the flow of current to the lube air pump solenoid. Attention is directed to the existence of relay 7CR–4 in line 6 which is normally open, so that prior to closing 5CR–1 and 6CR–1, no current will be directed to the solenoid for the air pump, and no lubricating oil will be dispensed by air pump 52. Even following the closing of relays 5CR–1 and 6CR–1, "OLT" SWITCH (normally open) and relay 7CR–1 (also normally open) prevent the flow of current in line 6A to the lube pump solenoid or the press motor.

Coil 6CR also actuates relay 6CR–2 (line 20 and normally open) to a closed position energizing solenoid 74 for the lube diverting valve 56. Actuating the diverting valve connects the oil source and pump 52 (see FIGURE 2) to connection 60 for direct flow of oil to overload chamber 28. Bypassing the metering block permits the overload chamber to be quickly pressurized to the desired pressure.

Coil 6CR also actuates relay 6CR–3 (line 24 and normally open) to a closed position. Relay 6CR–3 has two functions, to establish the hold circuit for line 23, and to energize overload lube timer "OLT" (88) oscillating overload lube timer switch 94 in line 6A and in series with 6CR–1. This is a bypass circuit around the automatic lube system circuit, and the opening and closing of switch 94 will pulse the press lube pump by coil EV4 causing the pump to operate continuously. In that all of the oil is diverted into the overload chamber 28, through diverting valve 56 and the connection 60 which bypasses the lube system metering block, the overload chamber 28 is quickly filled.

When pressure in the hydraulic overload chamber reaches the required level, overload low pressure switch "OPLS" 78 in line 25 (FIGURE 3) closes energizing coil 7CR. This coil in turn actuates emergency stop relay 7CR–1 in line 5, which is normally open, to a closed position. Up to this time circuit lines 5 and 6 are still open.

Relay 7CR–2 (line 23, normally closed) opens on energized coil 7CR. This breaks both circuits 23 and 24 de-energizing coil 6CR and overload lube timer 88, the latter opening "OLT" switch 94 in line 6A and shutting off the lube air pump valve. De-energizing coil 6CR also opens relay 6CR–1 in lube circuit 6A, and relay 6CR–2 in circuit 20. The latter causes the lube diverting valve solenoid 74 to be de-energized in turn causing the diverting valve to return to its first position to direct the flow of lube oil to the metering block for normal operation.

Relay 6CR-3 in the hold circuit also moves to its normally open position on de-energizing of solenoid 6CR.

Two additional relays are actuated by coil 7CR, relay 7CR-3 in line 27 and 7CR-4 in line 6. The former turns on green light 80 indicating to the operator that the overload system is set. The latter allows actuation of the lube air pump for normal operation permitting the passage of current to coil EV4.

Assume that the mode of the press is ready for operation, i.e. that preload pressure is maintained, "OLPS" pressure switch is closed, coil 7CR is energized and its contacts in the circuit are in their respective and proper position. In line 27, 7CR-3 contact is closed and the green light is lit. The coil 5CR is energized and maintained by the 5CR-2 contact in line 22. The 7CR-2 contact in line 23 is open, consequently, coil 6CR is de-energized and also the overload lube timer. In line 26, 5CR-3 contact is open and the red light is off. 7CR-1 and 5CR-1 in line 5 are closed and the press clutch circuit can be activated. The clutch circuit is energized and the press ram starts its downward motion, strikes an interference in the die causing an overload condition.

When the overload condition occurs the overload high pressure switch "OHPS" (76) is thrown to its open position interrupting the electrical circuit and in particular, line 21.

Instantaneously thereafter, relief valve 44, FIGURE 2, opens relieving the oil from overload chamber 28 allowing the press to continue its stroke for a short distance.

With the break in line 21, coil 5CR is de-energized opening relay 5CR-1 (line 6) stopping the press, relay 5CR-2 (line 22) allowing reset button 86 to move to the open position, and 5CR-3 (line 26) turning on red overload light 74.

At this time the press is stopped, oil has been relieved from the cylinder and the press is inoperative. To put the press back into operation the reset button 86 is depressed, energizing coil 5CR, thus establishing a circuit in line 5, the maintaining circuit in line 22, and turning the red light off indicating an overload. At the same instance, the second set of contacts on the reset button, shown in line 23, energizes the coil of 6CR establishing circuit continuity in line 6A, closing the maintaining contact in line 24, and the lube diverting valve solenoid in line 20 is also energized. In addition to this, at the same instant, the overload lube timer motor shown in line 24 is energized and the contact 94 of the timer is operated in series with 6CR-1 shown in line 6A. This circuit is maintained until the oil low pressure switch "OLPS" in line 25 is closed.

When the "OLPS" closes, the coil 7CR is energized and the circuit is now established in line 5 and line 6. The contact in line 23 is opened de-energizing the overload lube timer and the coil 6CR. Also the contact in line 27 is closed indicating that a preload pressure has now been established and the press is now ready for operation.

If pressure in the hydraulic overload chamber 28 drops below normal, the overload low pressure switch "OLPS" 78 opens de-energizing coil 7CR, which opens relay 7CR-1 stopping the press, closes relay 7CR-2 in preparation for reset, and opens relay 7CR-3 giving an indication in light 90 of lack of preload pressure.

As an example in accordance with the invention, the low pressure switch "OLPS" 78 may be set for a pre-load pressure of about 500 lbs. and pressurization of overload chamber 28 above this pressure closes the overload low pressure switch. The high pressure contacts may be set for an oil pressure equivalent to about 115% of the press capacity, which could be in the neighborhood of 2200 to 3000 p.s.i.

It is apparent that the present invention provides an overload system which can easily and inexpensively be added to an existing press utilizing an existing lube oil system. It involves very simply modifying a flange member or other part of the press to define with one of the moving components an overload pressure chamber, and supplying that overload chamber with oil from the lube system. The latter requires only two connections, one for fast filling of the overload chamber from the lube reservoir, and the other for dispensing of minimum flow through the metering block. This is accomplished by the addition of one section to the metering block, and the use of a simple small diverting valve interposed between the metering block and the lube system reservoir. Minor modifications to the electrical system are achieved by the addition of a solenoid to actuate the diverting valve, a low pressure switch and circuit responsive thereto to cause movement of the diverting valve to its normal position feeding flow to the metering block, and a high pressure switch and circuit therefor, responsive to an overload condition, capable of turning off the press and warning the operator of the condition.

Association of the overload system with the press slide also permits some give or continued travel of the press ram during stopping of the press.

What is claimed is:

1. A novel hydraulic overload system which can inexpensively be attached to existing presses utilizing the press existing lubrication system, comprising:

means in combination with a movable component of said press responsive to the press load to define an overload chamber, said chamber being compressible with an overload condition;

means connecting said overload chamber to the existing press lubrication system;

an overload high pressure switch associated with said chamber responsive to said overload condition;

circuit means including said overload high pressure switch and drive means for the press operable to interrupt operation of the press in response to an overload condition.

2. A system according to claim 1 further including means to preload said overload chamber to a predeterlow pressure within the chamber;

a low pressure switch responsive to the pressure in said overload chamber;

said circuit means including said low pressure switch operable to interrupt operation of the press until said low pressure is established within the overload chamber.

3. A novel hydraulic overload system which can inexpensively be attached to existing presses utilizing the press existing lubrication system comprising:

a press slide;

flange means in combination with said press slide defining and overload chamber;

piston means movable in said chamber relative the flange means operable to compress said chamber in response to an overload condition;

a lubrication system for said press comprising an oil source;

pump means to distribute oil from said source;

metering block means for distribution of oil from said pump means;

valve means interposed between said pump means and metering block means, said valve means also being connected to said overload chamber;

means connecting said metering block to said overload chamber; and means actuating said valve means alternately between a first position transmitting oil to said metering block means and a second position transmitting oil directly to said overload chamber.

4. An overload system according to claim 3 wherein said press slide is adapted for up and down movement, said press flange being beneath the press slide and having in the upper surface thereof a recess dimensioned to accommodate said press slide for movement of the flange relative the slide, said flange being bored from the top surface down to a diameter less than the diameter of said recess, but sufficient to accommodate said piston means for up and down movement relative the flange means, the oil pressure force in said overload chamber forcing said piston means upwardly against the bottom surface of said slide.

5. An overload system according to claim 3 including a high pressure switch and a low pressure switch both responsive to pressure in said overload chamber;
said actuating means comprising a solenoid;
circuit means adapted to energize said solenoid so that said valve means is in its second position during initial filling of said overload chamber, and is shifted to its first position in response to closing of said low pressure switch;
said circuit means being operable to stop said press in response to an overload condition detected by said high pressure switch.

6. A press overload system according to claim 3 wherein said overload chamber is between said press slide and press flange, the pressure in said overload chamber normally holding the press flange and press slide in spaced apart relationship;
means to limit the spacing between said press flange and press slide to a predetermined distance;
means to release the pressure in said overload chamber in response to an overload condition;
said predetermined distance permitting limited movement of said press slide relative the press flange during stopping of the press on detection of an overload condition.

7. A novel hydraulic overload system which can inexpensively be attached to existing presses utilizing the press existing lubrication system, comprising press slide means;
flange means connected to said press slide means defining therewith an overload chamber, said flange means being movable relative to the press slide means to compress said chamber;
an oil sump in said flange means;
pressure relief valve means to permit the flow of oil from said overload chamber to said sump in response to an overload condition, whereby said chamber is compressed to permit some continued movement of said slide relative the flange means;
a lubrication system for said press comprising an oil source;
pump means to distribute oil from said source;
metering block means for distribution of oil from said pump means; and
means connecting said metering block means to said overload chamber.

8. A system according to claim 7 further comprising:
circuit means including high pressure switch means and low pressure switch means each responsive to pressure in said overload chamber;
said circuit means being operable to stop said press in response to an overload pressure detected by said high pressure switch;
said high pressure switch means and pressure relief valve means being set to be responsive to substantially the same pressure.

9. A system according to claim 8 wherein said metering block means maintains a preload minimum pressure in said overload chamber;
said circuit means being operable to stop said press in response to a pressure in said chamber below said minimum pressure detected by said low pressure switch.

10. A system according to claim 9 including metering block bypass means between said pump means and overload chamber;
valve means operable to distribute oil either to said bypass means or said metering block means.

11. A novel hydraulic overload system which can inexpensively be attached to existing presses utilizing the press existing lubrication system, comprising:
a press slide means including an impact side;
flange means attached to said press slide means on the impact side thereof;
an overload chamber defined by said press slide means and flange means, said flange means being movable relative the press side means to compress said chamber;
an oil source;
pump means to distribute oil from said source;
metering block means to distribute oil from said pump means;
means connecting said metering block means to said overload chamber;
bypass means connecting said pump means to said overload chamber around said metering block means;
three-way valve means between said pump means and metering block means connected to said bypass means operable in a first position to transmit oil to said bypass means to establish a preload pressure in said overload chamber, and alternatively in a second position, to transmit oil to said metering block means to maintain the preload pressure in said chamber;
oil sump means in said flange means;
pressure relief valve means connecting said oil sump means to said overload chamber to permit flow of oil from said overload chamber to said sump means in response to an overload condition;
circuit means including high pressure and low pressure switch means responsive to pressure in said overload chamber;
said circuit means being operable to stop the press in response to an overload condition detected by said high pressure switch means and in response to a pressure in said overload chamber less than said preload pressure detected by said low pressure switch means.

12. A system according to claim 11 wherein said pressure relief valve means and high pressure switch means are responsive to substantially the same pressure in said overload chamber.

References Cited

UNITED STATES PATENTS

| 3,014,420 | 12/1961 | Richter | 100—53 |
| 3,426,873 | 2/1969 | Tezuka | 192—150 |

FOREIGN PATENTS

| 564,917 | 10/1958 | Canada. |
| 657,540 | 3/1938 | Germany. |
| 1,177,006 | 8/1964 | Germany. |

BILLY J. WILHITE, Primary Examiner

U.S. Cl. X.R.
184—14; 192—150